United States Patent [19]

Jackson

[11] Patent Number: 5,193,049
[45] Date of Patent: Mar. 9, 1993

[54] ENCLOSURES FOR ELECTRICAL SWITCHGEAR

[75] Inventor: Leonard Jackson, Newcastle upon Tyne, England

[73] Assignee: Northern Engineering Industries, plc, Newcastle upon Tyne, England

[21] Appl. No.: 764,080

[22] Filed: Sep. 23, 1991

Related U.S. Application Data

[63] Continuation-in-part of Ser. No. 610,749, Nov. 8, 1990, abandoned.

[30] Foreign Application Priority Data

Dec. 1, 1989 [GB] United Kingdom ................. 8927193

[51] Int. Cl.⁵ .............................................. H05K 7/20
[52] U.S. Cl. .................................... 361/379; 361/383
[58] Field of Search .......... 200/144 R, 148 R, 148 B; 361/334, 335, 336, 379, 383

[56] References Cited

U.S. PATENT DOCUMENTS

| | | | |
|---|---|---|---|
| 1,821,804 | 9/1931 | Hill | 361/379 |
| 1,843,286 | 2/1932 | Jansson | 361/379 |
| 4,549,242 | 10/1985 | Nebon et al. | 361/379 |

FOREIGN PATENT DOCUMENTS 0148240 11/1979 Japan ................. 361/379

Primary Examiner—Gregory D. Thompson
Attorney, Agent, or Firm—Cushman, Darby & Cushman

[57] ABSTRACT

An enclosure for electrical switchgear is a box like structure made up of side panels, front and rear panels and external panels. The panels define chimneys which are connected to the enclosure via apertures at their lower ends. Thus if the gas filled circuit breaker chamber explodes as a result of a fault developing, the enclosure is relieved of the resulting pressure generated by the expanding gases by venting to a ventilation system via the apertures and the chimneys.

9 Claims, 2 Drawing Sheets

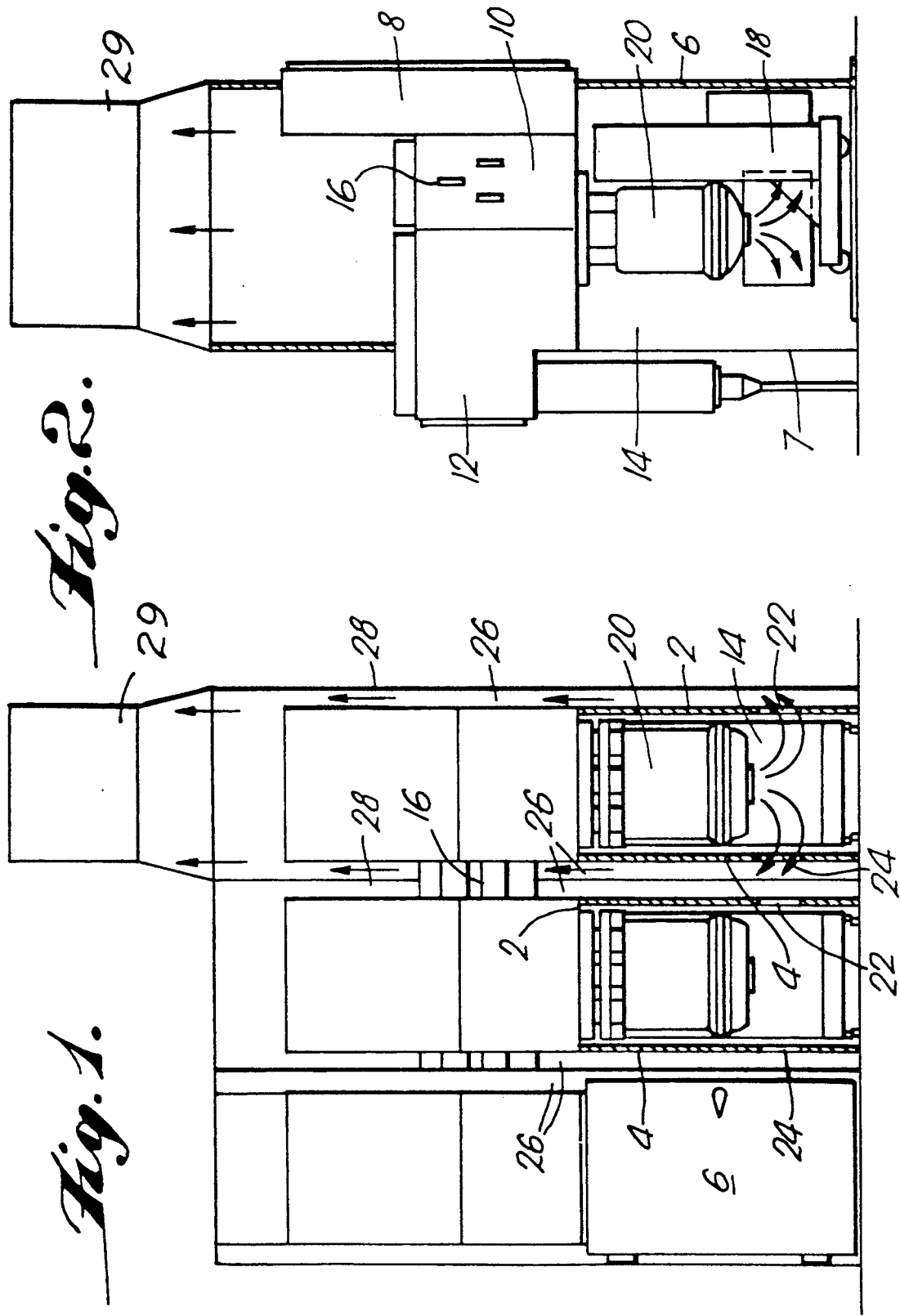

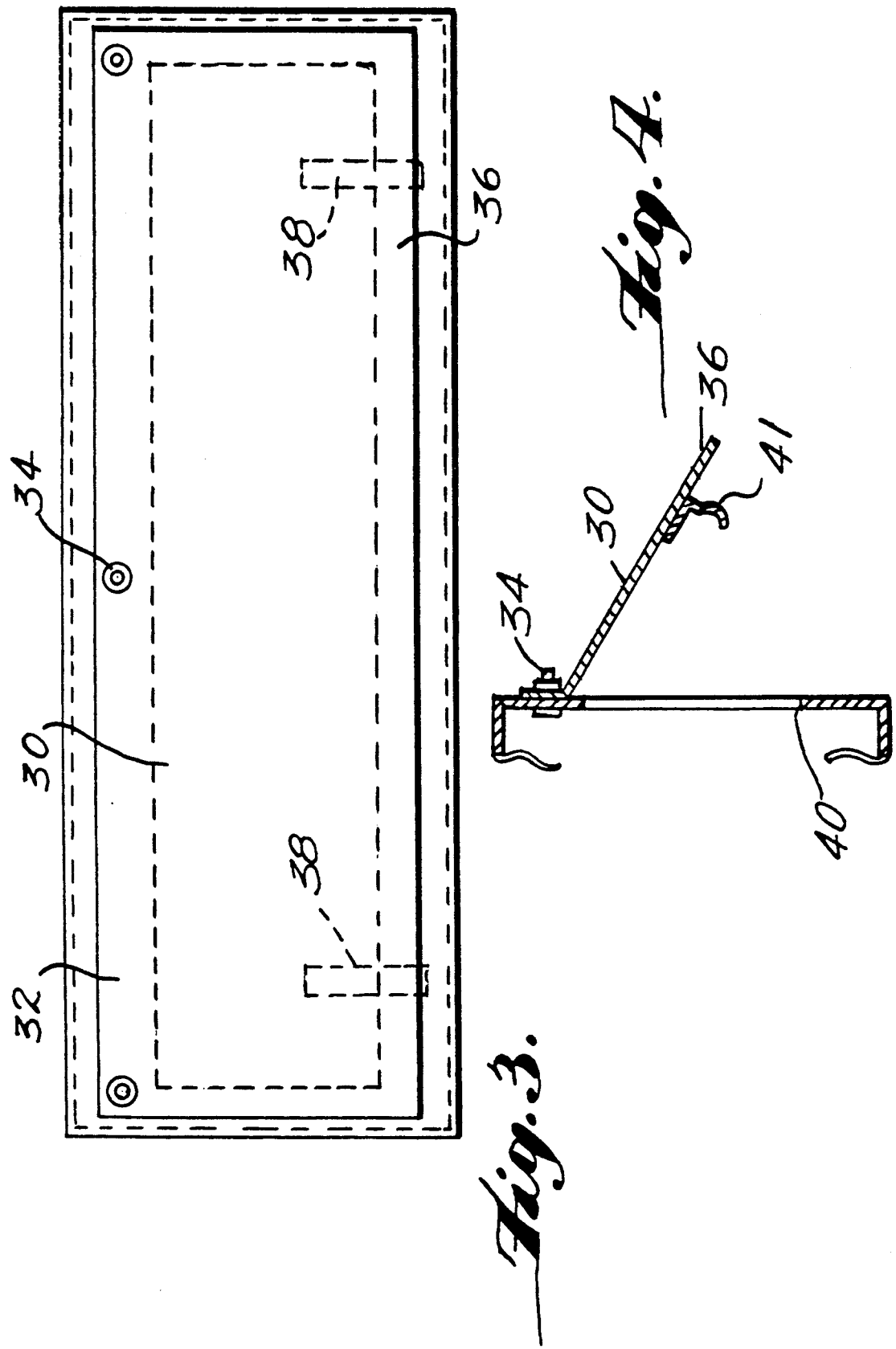

5,193,049

ENCLOSURES FOR ELECTRICAL SWITCHGEAR

This is a continuation-in-part of application Ser. No. 07/610,749, filed on Nov. 8, 1990, which was abandoned upon the filing hereof.

FIELD OF THE INVENTION

This invention relates to enclosures for electrical switchgear and has particular application to enclosures for switchgear incorporating high voltage electric circuit breakers.

BACKGROUND OF THE INVENTION

The enclosures for such switchgear are commonly of welded steel and are divided into compartments typically housing cables, current transformers, busbars, auxiliary equipment, and the circuit breaker.

With vertically isolatable switchgear—i.e. switchgear in which the circuit breaker is moved vertically within the enclosure to allow connection or isolation of the associated mains circuit—the circuit breaker is commonly located beneath the other compartments and typically includes a sealed chamber filled with insulating and arc interteruption media, for example $SF_6$ gas.

Fault currents and voltages within the circuit breaker chamber may be extremely high and, if an abnormal condition should arise whereby the operational capability of the equipment is impaired, inadvertent and undesirable arcing may occur within the chamber.

The consequential temperature and pressure rises within the chamber resulting from this undesirable arcing may be so high that disruptive failure of the chamber can occur.

Although it is known to provide pressure relief means on the chambers to permit venting thereof once the pressure therein exceeds a predetermined value, the pressure created within the enclosure as a result of faults within the circuit breaker chamber can cause serious damage to the enclosure, particularly as this increased pressure is created in the lower regions of the enclosure and cannot be readily exhausted upwardly therefrom.

It would be desirable to be able to provide an enclosure for vertically isolatable electrical switchgear which is less prone to damage as a result of the effects of internal faults in the circuit breaker chamber.

SUMMARY OF THE INVENTION

According to the present invention there is provided an enclosure for electrical switchgear, the enclosure containing, within its lower regions, a vertically-movable circuit breaker assembly including a sealed chamber housing circuit breaking components, the enclosure being characterised by at least one outlet from the lower regions thereof feeding into an associated exhaust chimney defined between a sidewall of the enclosure and an adjacent panel.

In a preferred embodiment of the invention, the enclosure comprises opposed sidewalls in the lower regions of each of which is provided an outlet from the enclosure, each outlet feeding into an associated exhaust chimney one to each side of the enclosure.

Conveniently each exhaust chimney is defined by a sidewall of the enclosure, a side panel parallel with said sidewall of the enclosure and front and rear panels, the chimney exhausting through the upper end thereof.

A substation may comprise a plurality of enclosures according to the invention disposed side by side, an exhaust chimney being defined between a sidewall of one enclosure, a sidewall of the adjacent enclosure and front and rear panels whereby said exhaust chimney is common to the one and the adjacent enclosures.

Alternatively, the sidewalls of adjacent enclosures, together with associated front and rear panels, may define between them a space in which is located an upright panel dividing said space into first and second exhaust chimneys, one associated with each of the adjacent enclosures.

Preferably each exhaust chimney feeds into an associated ventilation system, while each outlet from the lower regions of an enclosure, and/or the top of each exhaust chimney, may be provided with a flexible sheet cover adapted to be displaced from its cover position on increase of gas pressure within the enclosure.

DESCRIPTION OF THE DRAWINGS

By way of example only, an embodiment of the invention will now be described in greater detail with reference to the accompanying drawings of which:

FIG. 1 is a front view of a series of enclosures according to the invention, two with their front doors removed, and FIG. 2 is a side view of the switchgear housed within each of the enclosures of FIG. 1.

FIG. 3A is a frontal view of a typical blast-off cover which can be used as a flexible sheet cover.

FIG. 3B is a side view of a typical blast-off cover in the open position

DETAILED DESCRIPTION OF THE INVENTION

Referring to FIGS. 1, 2, there are illustrated switchgear enclosures each of welded steel and each including a pair of opposed sidewalls 2,4 and an openable door 6 fronting the lower regions of the enclosure.

Each enclosure includes an instrument and relay compartment 8, a busbar chamber 10, a current transformer chamber 12 and a circuit breaker compartment 14 in the lower regions thereof below the chambers 10 and 12. Busbars 16 extend between adjacent enclosures.

The compartment 14, which is defined between the lower regions of the sidewalls 2,4, a front wall which effectively is a door 6, and a rear wall 7, houses a carriage 18 which can be wheeled into and out of the compartment 14 through the door 6, the carriage 18 carrying a sealed chamber 20 filled with, for example $SF_6$ gas and containing a high voltage electric circuit breaker. The chamber 20 can be moved vertically on the carriage 18 to allow connection or isolation of the mains circuit.

As mentioned above, the chambers 20 can be prone to explosion in the event of abnormal operating conditions therein, and this can lead to deformation and damage to the enclosures and may be prejudicial to the safety of personnel adjacent the enclosures. This problem is particularly relevant to vertically-isolatable switchgear in which the circuit breaker chambers 20 are located in the lower regions of the enclosures below the busbar chambers 10 and current transformer chambers 12, which chambers 10 and 12 effectively block-off exhaust passages upwardly within the enclosures.

In order to provide for internal relief of the enclosures on build-up of pressure therein due to malfunctioning of the circuit breakers, there are provided, for each enclosure, a pair of outlets 22,24 in the lower regions of the sidewalls 2,4, these outlets each feeding into a vertical chimney 26 defined by the associated sidewall 2 or 4 of the enclosure, a vertical panel 28 extending parallel with the sidewall 2 or 4 and disposed between the sidewalls of adjacent enclosures, and front and rear panels (not shown) extending between adjacent enclosures.

Thus it will be appreciated that gas under pressure within the compartment 14 is exhausted in the direction of the arrows through the outlets 22,24 and into the chimneys 26, the upper ends of which chimneys may feed into a ventilation system shown generally at 29.

Each outlet 22,24, as well as the top of each chimney 26, is preferably provided with a flexible sheet cover, typically of 1 mm thick sheet material, which normally covers the outlet and which is displaced by the exhaust gases on pressure build-up within the enclosure to permit passage of the gases to exhaust. In a specific embodiment, the sheet material is a steel plate as shown in FIGS. 3A and 3B at 30 for outlet 22 and has one edge 32 fastened with a line of bolts such as at 34 to one side of the outlet 22. The identical arrangement will be used for the other outlet 24 and will not therefore be described. With this arrangement the non bolted edge 36 of the plate 30 may be restrained from opening by yieldable clips 38 which engage the opposite edge 40 of the outlet 22.

Pressure buildup in the enclosure acts on the sheet material 30 to try and force it away. The thickness of the clips 38 is such that they resist bending until a sufficient pressure builds up. When a sufficient pressure builds up in the enclosure, the yieldable portion 41 bends, thereby allowing the cover to bend along its bolt line 34, to an open position as shown in FIG. 3B.

The precise configurations and locations of the chimneys 26 may vary from those shown in the drawings—in particular, the panels 28 may be dispensed with, whereby a chimney is defined between the sidewalls of adjacent enclosures together with front and rear panels, the chimney being common to the enclosures. Other modifications and variations from the illustrated arrangement will be apparent to those skilled in the art.

I claim:

1. An enclosure for electrical switchgear, comprising:
   a plurality of walls defining an upper enclosure portion and lower enclosure portion;
   at least one of said plurality of walls being one sidewall defining a part of said upper enclosure portion and said lower enclosure portion, said sidewall having an outlet in said lower enclosure portion, said outlet being closed with a flexible sheet cover displaceable from its closed position by an increase of pressure within said enclosure;
   a vertically movable circuit breaker assembly contained within said lower enclosure portion, said vertically moveable circuit breaker assembly having a sealed chamber which houses at least one circuit breaker, and
   at least one exhaust chimney having a plurality of walls and defined in part by said sidewall, said outlet feeding into said exhaust chimney.

2. An enclosure as claimed in claim 1, wherein said exhaust chimney feeds into an associated ventilation system.

3. An enclosure as claimed in claim 1, wherein another one of said plurality of walls is another sidewall disposed opposite said one sidewall with each defining a part of said upper enclosure portion and said lower enclosure portion, said sidewalls each having an outlet in said lower enclosure portion, at least one of said outlets being provided with said flexible sheet cover, said outlet from one sidewall feeding into a first exhaust chimney being in part defined by said one sidewall, and said outlet from said another sidewall feeding into a second exhaust chimney being in part defined by said another sidewall.

4. An enclosure for electrical switchgear, comprising:
   a plurality of walls defining an upper enclosure portion and a lower enclosure portion;
   at least one of said plurality of walls being one sidewall defining a part of said upper enclosure portion and said lower enclosure portion, said sidewall having an outlet in said lower enclosure portion;
   a vertically movable circuit breaker assembly contained within said lower enclosure portion, said vertically moveable circuit breaker assembly having a sealed chamber which houses at least one circuit breaker, and
   at least one exhaust chimney having a plurality of walls and defined in part by said sidewall, said exhaust chimney having an exhaust outlet being closed with a flexible sheet cover displaceable from its closed position by an increase of pressure within said enclosure, said outlet feeding into said exhaust chimney.

5. An enclosure as claimed in claim 1, wherein said exhaust outlet feeds into an associated ventilation system.

6. A substation for electrical switchgear comprising:
   a plurality of enclosures disposed side by side each having a plurality of walls defining an upper enclosure portion and a lower enclosure portion, at least one of said plurality of walls of each enclosure being a sidewall defining a part of said upper enclosure portion and said lower enclosure portion, said sidewall having an outlet in said lower enclosure portion, a vertically moveable circuit breaker assembly contained within said lower enclosure portion, said vertically moveable circuit breaker assembly having a sealed chamber which houses at least one circuit breaker; and
   at least one exhaust chimney having a plurality of walls and defined in part by said sidewall of one of said enclosures and said sidewall of an adjacent enclosure, said sidewall outlet of said one enclosure and said sidewall outlet of an adjacent enclosure feeding into said exhaust chimney, at least one of said outlets being closed with a flexible sheet cover displaceable from its closed position by an increase of pressure within said enclosure, whereby said exhaust chimney is common to said one and said adjacent enclosures.

7. A substation for electrical switchgear comprising:
   a plurality of enclosures disposed side by side each having a plurality of walls defining an upper enclosure portion and a lower enclosure portion, at least one of said plurality of walls of each enclosure being a sidewall defining a part of said upper enclosure portion and said lower enclosure portion, said sidewall having an outlet in said lower enclosure portion, a vertically moveable circuit breaker assembly contained within said lower enclosure portion, said vertically moveable circuit breaker assembly having a sealed chamber which houses at least one circuit breaker; and at least one exhaust space having a plurality of walls and defined in part by said sidewall of one of said enclosures and said sidewall of an adjacent enclosure, said exhaust space having an upright panel dividing said exhaust space into a first exhaust chimney for said one of said enclosures and a second exhaust chimney for said adjacent enclosure, said sidewall outlet of said one of said enclosures feeding into said first exhaust chimney and said sidewall outlet of said adjacent enclosure feeding into said second exhaust chimney, at least one of said outlets associated with one of said one and said adjacent enclosures being closed with a flexible sheet cover displaceable from its closed position by an increase of pressure within said associated enclosure.

8. A substation for electrical switchgear comprising:

a plurality of enclosures disposed side by side each having a plurality of walls defining an upper enclosure portion and a lower enclosure portion, at least one of said plurality of walls of such enclosure being a sidewall defining a part of said upper enclosure portion and said lower enclosure portion, said sidewall having an outlet in said lower enclosure portion, a vertically moveable circuit breaker assembly contained within said lower enclosure position, said vertically moveable circuit breaker assembly having a sealed chamber which houses at least one circuit breaker; and at least one exhaust chimney having a plurality of walls and defined in part by said sidewall of one of said enclosures and said sidewall of an adjacent enclosure, said sidewall outlet of said one enclosure and said sidewall outlet of said adjacent enclosure feeding into said exhaust chimney, said exhaust chimney having an exhaust outlet being closed with a flexible sheet cover displaceable from its closed position by an increase of pressure within one of said enclosures, wherein said exhaust chimney is common to said one and said adjacent enclosures.

9. A substation for electrical switchgear comprising:

a plurality of enclosures disposed side by side each having a plurality of walls defining an upper enclosure portion and a lower enclosure portion, at least one of said plurality of walls of each enclosure being a sidewall defining a part of said upper enclosure portion and said lower enclosure portion, said sidewall having an outlet in said lower enclosure portion, a vertically moveable circuit breaker assembly contained within said lower enclosure portion, said vertically moveable circuit breaker assembly having a sealed chamber which houses at least one circuit breaker; and at least one exhaust space having a plurality of walls and defined in part by said sidewall of one of said enclosures and said sidewall of an adjacent enclosure, said exhaust space having an upright panel dividing said exhaust space into a first exhaust chimney for said one enclosure and a second exhaust chimney for said adjacent enclosure, said sidewall outlet of said one enclosure feeding into said first exhaust chimney and said sidewall outlet of said adjacent enclosure feeding into said second exhaust chimney, at least one of said exhaust chimneys associated with one of said enclosures having an exhaust outlet being closed with a flexible sheet cover displaceable from its closed position by an increase of pressure within said association enclosure.

* * * * *